No. 820,061. PATENTED MAY 8, 1906.
D. H. MOSTELLER.
ICE CREAM SPOON.
APPLICATION FILED SEPT. 26, 1905.
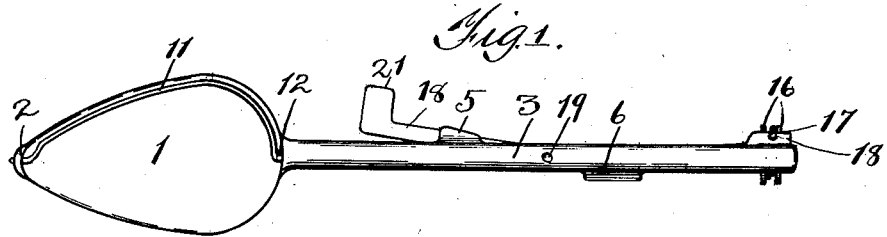
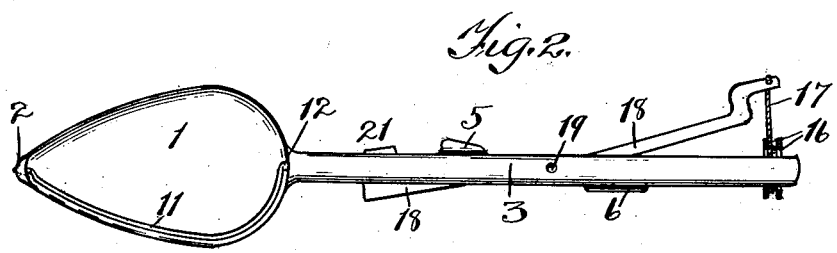
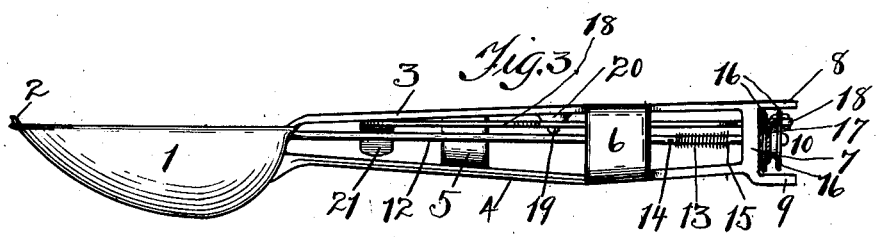
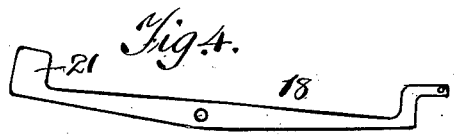
Witnesses:
Inventor

UNITED STATES PATENT OFFICE.

DOSIER H. MOSTELLER, OF CHICAGO, ILLINOIS, ASSIGNOR OF ONE-FOURTH TO RITLEY N. BAYLIES AND ONE-FOURTH TO FRED N. BAYLIES, OF CHICAGO, ILLINOIS.

ICE-CREAM SPOON.

No. 820,061.   Specification of Letters Patent.   Patented May 8, 1906.

Application filed September 26, 1905. Serial No. 280,174.

*To all whom it may concern:*

Be it known that I, DOSIER H. MOSTELLER, a citizen of the United States, residing at Chicago, in the county of Cook and State of Illinois, have invented a certain new and useful Improvement in Ice-Cream Spoons, of which the following is a specification.

The present invention relates to spoons for use in dipping or removing ice-cream from a freezer and to that type of such spoons having a scraper operating in the bowl of the spoon to clear or cut the ice-cream from the spoon and prevent sticking of the mass of ice-cream on or in the bowl of the spoon.

The objects of the invention are to furnish an efficient and reliable means for operating the scraper or cutter in the bowl of the spoon and to have such means located at a sufficient distance from the base of the spoon to prevent the ice-cream from clogging or interfering with the operation of the actuating means; to mount on the handle of the spoon a rock-shaft carrying the scraper or cutter of the bowl of the spoon and to arrange the actuating means for rocking the shaft at the end of the spoon-handle; to oscillate the scraper or cutter for the bowl of the spoon by means of a rock-shaft, a spool at the outer end of the rock-shaft, a flexible connection winding on the spool, a lever pivotally mounted on the handle of the spoon, and a return-spring connected with the shaft, and to improve generally the construction and arrangement of the several elements for actuating the scraper or cutter for the bowl of the spoon.

The invention consists in the features of construction and combinations of parts hereinafter described and claimed.

In the drawings, Figure 1 is a top or plan view showing the actuating means for oscillating the scraper or cutter of the bowl of the spoon in normal position; Fig. 2, a similar view to Fig. 1, showing the actuating means in position they occupy when the scraper or cutter has been carried over the surface of the bowl of the spoon; Fig. 3, a side elevation with the parts as in Fig. 1, and Fig. 4 a detail in plan of the lever for carrying the scraper or cutter across or over the surface of the spoon-bowl.

The bowl 1 of the spoon can be of any ordinary and well-known form of construction, except that at its apex end it is provided with a nose 2, which operates to divide the mass of ice-cream caught in the bowl of the spoon from the body of the ice-cream in the freezer, making a clean operation by which the adhering of ice-cream to the end of the spoon will be prevented, thus insuring the removal of the quantity of ice-cream carried by the spoon without any liability of an adherence and dropping off of a small portion of the ice-cream at the point of the spoon. The bowl of the spoon is attached to a handle consisting of an upper rail or bar 3 and a lower rail or bar 4, and, as shown, the upper and lower bars on one side are connected by a plate 5 and on the opposite side by a plate 6, which plates furnish a guard for the actuating mechanism carried by the handle. The handle at its outer end has a cross-bar 7, extending out from which is an upper rear plate 8 and a lower rear plate 9 with a space or opening 10 between the two plates.

The scraper or cutter 11 is of any usual form and is journaled at its forward end in the apex end of the spoon, and its rear end is attached to or formed with a rock-shaft or rod 12, extending through the base end of the spoon and through the cross-bar 7, so as to have a journal-support in the base end of the spoon and the cross-bar with the body of the shaft located between the top and bottom rail of the handle, as shown in Fig. 3.

The rock-shaft or rod 12 at its rear end forward of the cross-bar 7 is encircled by a coil-spring 13, one end 14 of which has a fixed connection with the shaft or rod and the other end 15 of which is laterally extended and engages the edge of the lower rail 4, so as to put the spring under tension when the rod or shaft is rocked in a direction to oscillate and carry the scraper or cutter 11 over or across the face of the spoon-bowl, which tension is sufficient to return the scraper or cutter to normal position, as shown in Fig. 1, when the force by which the shaft or rod was rocked is released. The rock-shaft or rod 12 extends beyond the cross-bar 7 and has fixedly mounted thereon a spool or winding-drum 16, formed of a center or body and side flanges, and to the center or body of the spool or drum is attached one end of a cord 17 for the cord to wind on and unwind from the body and in the unwinding turn the shaft or rod in a direction to oscillate the scraper or cutter across the face of the spoon-bowl. The other end of the cord 17 is attached to the end of an arm or lever 18, mounted on the handle of the spoon by a pin or pivot 19, extending out or entered into a boss 20 on the upper rail 3 of the spoon-handle, as shown in Fig. 3. The opposite end of the arm or lever 18 has a thumb or finger piece 21, adapted to be pressed against by the thumb or finger of the user of the spoon and carried inward to the position shown in Fig. 2, oscillating or vibrating the arm or lever on its pin or pivot 19 and carrying the outer end thereof away from the spoon-handle, as shown in Fig. 2, unwinding the cord and revolving the drum or spool 16 to rock the shaft and oscillate the scraper or cutter across the bowl of the spoon.

The operation will be understood from the foregoing description, but briefly is as follows: The user of the spoon dips the bowl thereof into the body of ice-cream in the freezer or receptacle, filling the bowl of the spoon to the full carrying capacity of the bowl. The user then raises the spoon as a whole, with the ice-cream carried by the bowl, and brings the bowl of the spoon over the place of deposit, and when the place is reached the user by pressing with the thumb or finger on the thumb or finger piece 21 swings the outer end of the lever 18 to the position shown in Fig. 2, causing the cord as it unwinds to revolve the drum or spool and rock the shaft, giving the scraper or cutter a positive movement, by which the ice-cream carried by the bowl of the spoon will be cleanly separated from the face of the spoon and dropped into the place of deposit without adhering or sticking to the surface of the bowl of the spoon. After the deposit of the ice-cream the user releases the pressure on the thumb or finger piece, when the coil-spring 13, which has been placed under tension by the unwinding of the cord, acts and returns the scraper or cutter to normal position, as shown in Fig. 1, and at the same time rewinds the cord on the drum or spool, bringing the parts in position for another operation.

The actuating parts for the scraper or cutter are located at the extreme end of the handle and entirely away from the bowl of the spoon, so that there is no liability of ice-cream entering the actuating parts and interfering with their operation. The arm or lever with the cord and drum or spool furnish an effective and reliable means for rocking the shaft carrying the scraper or cutter, so that the user will be assured that the scraper or cutter will be operated by pressing on the arm or lever, and the coil-spring furnishes a means for automatically returning the scraper or cutter to normal position with the release of the pressure on the arm or lever. The horn or projected point at the apex end of the spoon-bowl insures a clean cut and separation of the ice-cream received into the spoon-bowl from the body of ice-cream in the freezer or receptacle.

The spoon, with the scraper or cutter and the actuating means for oscillating the scraper or cutter, furnishes a reliable and effective device for removing and depositing ice-cream without having the ice-cream adhere or stick to the bowl of the spoon.

What I claim as new, and desire to secure by Letters Patent, is—

1. In an ice-cream spoon, the combination with the bowl and handle of the spoon of a scraper located and operating in the bowl, a rock-shaft extending longitudinally of and parallel with and carrying the scraper, a return-spring for the rock-shaft, a winding-spool fixed on the outer end of the shaft and a cord, and a lever having the cord attached to its outer end for operating the scraper within the bowl of the spoon, substantially as described.

2. In an ice-cream spoon, the combination of the bowl, the handle consisting of an upper rail and a lower rail, a rock-shaft mounted in the handle and bowl, a scraper within the bowl and carried by the rock-shaft, a return-spring encircling the rock-shaft, a winding-spool and cord fixed on the rock-shaft, and a lever pivotally mounted on the handle for operating the scraper within the bowl of the spoon, substantially as described.

DOSIER H. MOSTELLER.

Witnesses:
WALKER BANNING,
PAULINE BECKMAN.